Patented May 1, 1923.

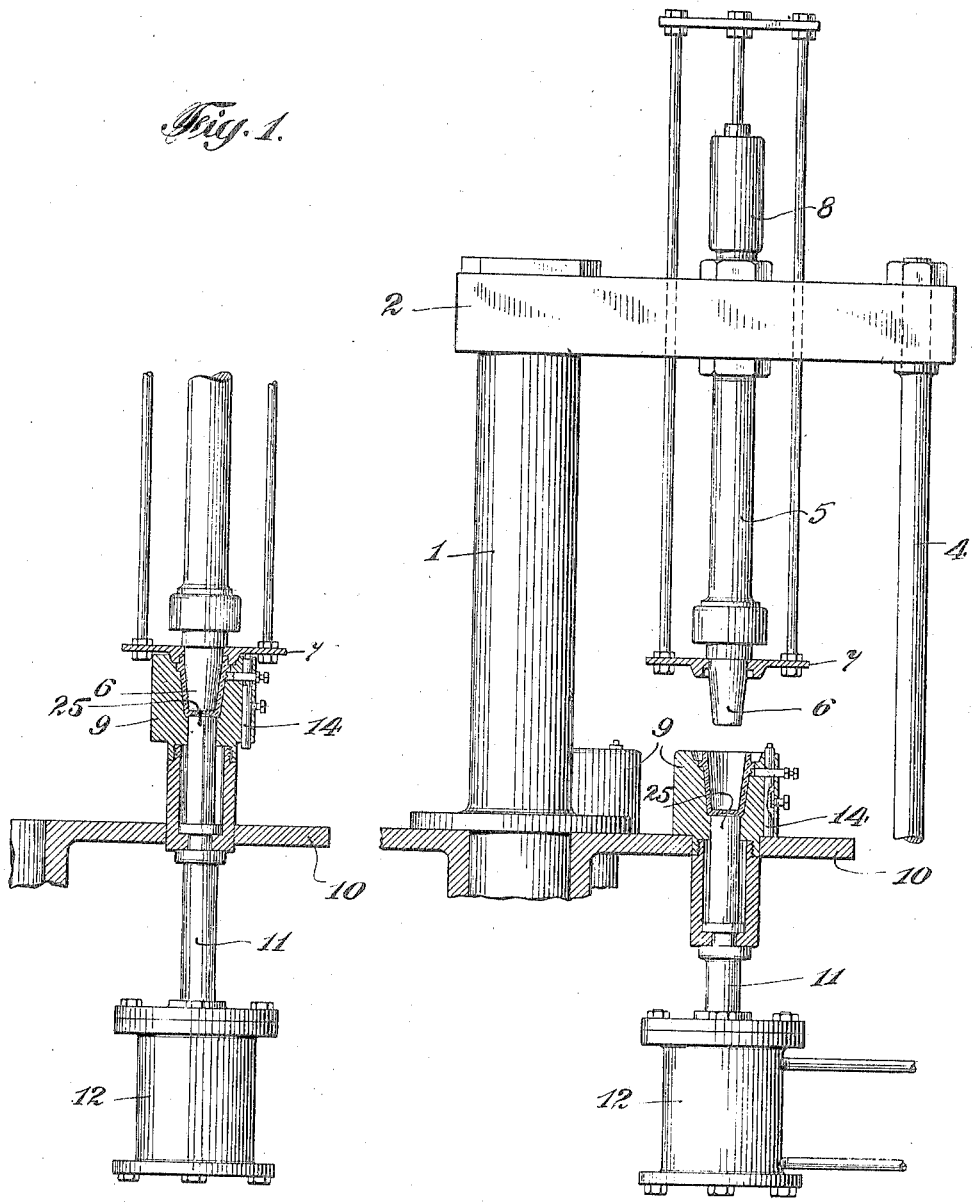

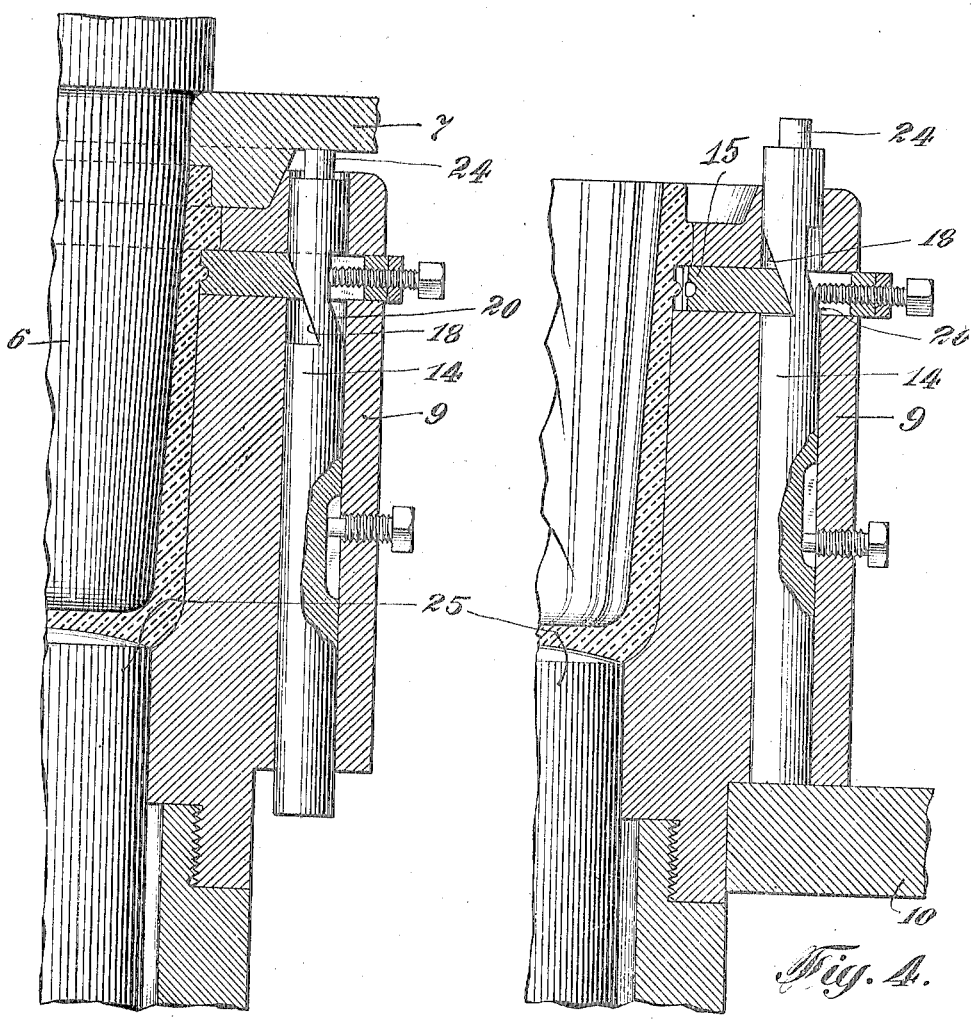

1,453,277

UNITED STATES PATENT OFFICE.

PETER KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

MATRIX DEVICE FOR MOLDS.

Application filed May 22, 1920. Serial No. 383,341.

*To all whom it may concern:*

Be it known that I, PETER KUCERA, a citizen of the United States, residing at Connellsville, in the county of Fayette, State of Pennsylvania, have invented certain new and useful Improvements in Matrix Devices for Molds, of which the following is a specification.

This invention relates broadly to molding and more particularly to molding by pressing plastic material such as glass or the like.

The principal object of the present invention is to provide a block mold with the provision of mechanism which permits figures either cameo or intaglio to be formed upon the article being shaped in the mold.

Another object of the present invention is a molding device of the character specified comprising a block mold and means movable relatively to portions on the side wall of the block mold in such manner that lateral projections or indentations may be formed on the side wall of the device being molded in the block mold.

A still further object of the present invention is a provision in pressing molds of movable portions whereby parts of the side wall of the mold may be removed to permit ware having indentations or projections, as the case may be, to be molded in block molds and to be removed therefrom when the moulding operation is complete.

More specifically the present invention comprises a block mold for plastic material and wherein movable matrices are provided in one of the pressing members so that either projections or recesses may be molded in the side wall of the article being made and the article may then be removed from the block mold without injury to the article.

Another object of the present invention is the mold of the character specified and wherein the movable parts are automatically operated during the movement of the parts of the molding operation.

Other and further objects of the present invention will in part be obvious and will in part be pointed out hereinafter in the specification wherein like parts are indicated by like characters throughout the several figures of the drawings.

Realizing that the present invention may be embodied in constructions other than those herein specifically shown and described, it is to be understood that the present disclosure is intended to be illustrative and not to be considered in the limiting sense.

Figure 1 is a view showing a mold embodying the present invention and illustrating the pressing operation.

Figure 2 is a view similar to Figure 1 showing the pressing operation finished.

Figure 3 is a detail view of a portion of the mold illustrating a construction in accordance with the present invention with the figure impressing device operative against a portion of a tumbler or packing jar and showing the parts during the pressing operation.

Figure 4 is a view similar to Figure 1 showing the impression device removed, with the glass article ready to be removed from the mold.

Figure 5 is a detail plan view of the impression device illustrating portions in sections.

Heretofore in the molding or pressing art as applied to glass wherein articles have been manufactured in block molds, it has been the custom to form projections or depressions by means of vertical removable portions of the mold, usually parts known as ring molds, so that when the ring mold was lifted from the block mold the article shaped in the block mold would be free for removal from the block mold. In this type of construction projections or depressions could only be made on the upper part of the article and could not be made in the body portion below the zone in which any projection or depression covered by the ring mold constructions was made. Where embossed or depressed designs were formed on the side wall on the containers below the top finish such configurations have usually been in split molds or blow molds so that when the article was formed the entire mold might be removed from the finished article by lateral movements of the mold body. The split mold usually leaves marks on the finished ware and such molds are more expensive to manufacture and operate. Furthermore, as a rule the split molds do not operate at the same speed as the block molds.

The present invention overcomes the difficulties of the known prior art by providing a block mold with a movable portion carrying the design or configuration which it is desired to impress upon the side wall of the article being formed. This movable portion may be arranged in such manner as to be impressed on the interior or exterior of the side wall and preferably is so arranged as to be automatically withdrawn by the ordinary operations of the machines carrying the mold. This construction permits this type of mold to be utilized on the ordinary machines without change of machine, the only change being in the mold structure itself. One specific embodiment of the present invention comprises a block mold for tumblers packers' ware, or the like, adapted to be carried by the ordinary glass press and wherein slidable matrix members are provided in the side wall of the mold in such manner that the movement of the parts during the pressing operations causes actuating means for the slides to become effective to withdraw the matrix from the side of the finished article when the pressing operation is completed.

Referring to the drawings, which disclose one embodiment of the invention, a detail of a portion of a glass press is illustrated and comprises a pedestal 1 on which is mounted a yoke 2 that is supported by frame rods 4. The yoke carries a staff 5 on which is mounted a pressing plunger 6. A ring mold 7 is mounted adjacent the pressing plunger and is adapted to be operated by an air cylinder 8 and connected parts to cooperate with a block mold 9 that is mounted on the mold table 10. There are a plurality of these block molds all mounted on the mold table, as is known in the art. The block mold is adapted to be moved into operative relation to the plunger 6 and this may be accomplished, as is known in the art, by means of an air pressing ram which may comprise a plunger head 11 which is operated by a suitable air cylinder 12 and is controlled by timing mechanism, not shown, which also controls the rotation of the mold table.

Referring especially to Figures 3, 4 and 5 the block mold 10 in Figure 3 is shown as being provided with an opening which extends parallel to the movement of the mold. This opening provides a guideway for the cam slide 14. The mold is also provided with a lateral opening that extends through the side wall of the mold and a figure block 15 is mounted in this slideway. This figure block is provided with an opening 16 through which the cam slide extends and one side of this opening may be inclined as at 17 to cooperate with the inclined cam 18. On the figure block 15 a stub screw 19 extends into the opening 16 and is adapted to rest against the cam face 20. This stub screw may be held in position by a lock nut 21. From the foregoing description it will be evident that the vertical movement of the cam slide relatively to the side wall of the block mold 9 will cause a lateral movement of the figure block 15. This figure block 15 is provided on its inner face with an ornamentation or the configuration which is illustrated as a recess 22. When the block mold is raised into pressing position as is shown in Figures 1 and 3 the inner face of the figure block forms a part of the side wall of the mold and the upper end 24 of the cam slide 14 is beneath a part of the ring mold 7 so that during the pressing operations the glass 25, or other plastic material, may be subjected to pressure without danger to the figure block yielding, in view of the fact that the cam slide cannot rise. The recess 22, or other configuration, impresses its imprint on the side of the article being made and when the molding operation is finished and the mold returns to position on the mold table the lower end of the cam slide 14 contacts with the mold table 10 thereby lifting the cam slide and consequently causing the figure block 15 to be withdrawn from the side of the glass or other article 25. The pressed article may now be removed from the mold block by means of a ware lift plunger 25 in the manner that is now known to the art.

From the illustrated embodiment of the invention herewith disclosed it will be obvious to all those familiar with the art that various shapes and sizes of figure blocks may be provided in such number as may be required around the wall of the article being made and it will also be clear that these slide blocks may also be provided on either the interior or exterior mold members as may be desired.

Having thus described my invention what I claim is:

1. In the art of molding in block molds, the combination of a block mold having side walls integral with the mold, a table upon which said block mold is mounted for vertical movement, a member extending through a portion of the side wall and having a molding face upon said member, said face being adapted to produce a configuration on the molded article comprising a protuberance extending at substantially right-angles to the movement of the finished article in being removed from the mold, means to normally maintain said member with the mold face comprising a part of the side wall of the block mold, said means being operated by the movement of the mold on the table to remove said face from operative position when the finished article is to be removed from the block mold.

2. In the art of molding in block molds, the combination of a block mold having side walls integral with the mold, a slidable member extending at right angles through a portion of the side wall and having a molding face upon said member, said face being adapted to produce a configuration on the molded article comprising a protuberance extending at substantially right-angles to the movement of the finished article in being removed from the mold, slidable cam means to normally maintain said member with the mold face comprising a part of the side wall of the block mold, and to remove said face from operative position when the finished article is to be removed from the block mold.

3. In the art of molding in block molds, the combination of a block mold having side walls integral with the mold, a table upon which said block mold is mounted for vertical movement, a slidable member extending at right angles through a portion of the side wall and having a molding face upon said member, said face being adapted to produce a configuration on the molded article comprising a protuberance extending at substantially right-angles to the movement of the finished article in being removed from the mold, slidable cam means to normally maintain said member with the mold face comprising a part of the side wall of the block mold, said means being operated by the movement of the mold on the table to remove said face from operative position when the finished article is to be removed from the block mold.

4. In the art of manufacturing articles in block molds having non-movable side walls, a block mold being provided with a hollow molding recess, a table on which said mold is mounted, a movable member extending into such recess in such manner that a portion of said member comprises a portion of the side wall of the said recess, means to move said mold on said table to apply pressure to material in said mold to mold an article from a suitable charge therein, and devices operated by said means to move said member to inoperative position whereby the face of said member is withdrawn from the molded article when it is desired to remove the molded article from the block mold.

5. In the art of manufacturing articles in block molds having non-movable side walls, a block mold being provided with a hollow molding recess, a movable member extending into such recess in such manner that a portion of said member comprises a portion of the side wall of the said recess, said member being provided with an opening, means for applying pressure to material in said mold to mold an article from a suitable charge and a slide cam extending through the opening and being operated by said means to move said member to inoperative position whereby the face of said member is withdrawn from the molded article when it is desired to remove the molded article from the block mold.

6. In the art of manufacturing articles in block molds having non-movable side walls, a block mold provided with a hollow molding recess, a table on which said mold is mounted, a movable member extending into such recess in such manner that a portion of said member comprises a portion of the side wall of the said recess, said member being provided with an opening, means to move said mold on said table to apply pressure to material in said mold to mold an article from a suitable charge therein, and devices comprising a slide cam extending through the opening and being operated by said means to move said member to inoperative position whereby the face of said member is withdraw from the molded article when it is desired to remove the molded article from the block mold.

7. In the art of molding, in block molds, the combination of a block mold, a slidable member extending through the side wall of said block mold and being provided on one end with a mold face carrying a configuration to be impressed upon the molded article, and means comprising a vertical slide cam operated by the raising of the mold during the pressing operations to maintain said member in operative position while pressure is being exerted on the block mold to perform the molding operation and operated by lowering of the mold to remove the face of said member from contact with the finished article when the pressing operation has been completed.

8. In the art of molding, the combination of a mold, a ring mold, a member operative in the side wall of said block mold and being provided with a mold face carrying a configuration to be impressed upon the molded article, and means comprising a slide cam adapted to contact with the ring mold to maintain said member in operative position while pressure is being exerted on the block mold to perform the molding operation and adapted to contact with the mold table to remove the face of said member from contact with the finished article after the pressing operation has been completed.

9. In the art of making articles of manufacture by pressing plastic material, the combination of a mold member, means to raise and lower said mold member into and out of operative relation to said plunger to perform the pressing operation, a matrix carrying device provided upon the mold member and having a portion of the device extending through the mold wall in such manner as to provide for impressing a configuration upon the article being molded, and mechanism comprising a cam slide operated by the movement of the said mold to to move said device into and out of operative engagement with the article being molded.

10. In the art of making articles of manufacture by pressing plastic material, the combination of mold members, means to cause a relative movement between said mold members to perform the pressing operation, a matrix carrying device provided upon one of the mold members and having a portion of the device arranged in such manner as to provide for impressing a configuration upon the article being molded, and mechanism operated by the other of said mold members to move said device into operative engagement with the article being molded, said mechanism being operated by the weight of the mold to move said device to operative position.

11. In the glass art or the like, the combination of a block mold, a plunger adapted to enter said block mold to shape a suitable charge in said mold into an article of ware, means for causing a relative movement between said plunger and said mold and adapted to apply pressing pressure to a charge in the mold, a matrix carrying member extending through one wall of said block mold, and mechanism operated by pressing pressure to maintain said matrix in operative position during the pressing operation and operated by the weight of the mold to remove said matrix member to inoperative position when the pressing operation has been completed.

12. In the glass art or the like, the combination of a block mold, a plunger adapted to enter said block mold to shape a suitable charge in said mold into an article of ware, a mold table, means for causing a relative movement between said plunger and said mold, a matrix carrying member extending through one wall of said block mold, a ring mold operative upon the block mold, and mechanism operated by said ring mold to maintain said matrix in operative position during the pressing operation and said mold table engaging said mechanism to remove said matrix member to inoperative position when the pressing operation has been completed.

13. A block mold for the manufacture of glassware or the like comprising in combination a body portion with a mold recess, a slidable member extending through the side wall of the mold and being provided on one end with a configuration adapted to be impressed upon the article being molded and a slide cam carried by the mold and longer than the mold and adapted to move said member into engagement with the finished mold article when the mold is raised and out of engagement therewith when the mold is lowered.

14. A block mold for the manufacture of glassware or the like comprising in combination a body portion provided with a mold recess, a mold table, a ring mold, a member mounted upon the side wall of the mold and being provided on one end with a configuration adapted to be impressed upon the article being molded and means operated by the ring mold to move said member into operative position and operated by the mold table to move said member out of engagement with the finished molded article.

PETER KUCERA.